(12) United States Patent
Junge (10) Patent No.: US 8,376,097 B2
(45) Date of Patent: Feb. 19, 2013

(54) BACKING FOR BRAKE DEVICES, ESPECIALLY DRUM BRAKES, BACKING/FRICTION LINING UNIT AND BACKING SUPPORT OF A PRESSING DEVICE (75) Inventor: Klaus Junge, Berlin (DE)

(73) Assignee: TMD Friction Services GmbH, Leverkusen (DE)

( * ) Notice: Subject to any disclaimer, the term of this patent is extended or adjusted under 35 U.S.C. 154(b) by 876 days.

(21) Appl. No.: 12/293,359

(22) PCT Filed: Mar. 27, 2007

(86) PCT No.: PCT/EP2007/002696
§ 371 (c)(1),
(2), (4) Date: Sep. 17, 2008

(87) PCT Pub. No.: WO2007/110227
PCT Pub. Date: Oct. 4, 2007

(65) Prior Publication Data
US 2010/0012448 A1 Jan. 21, 2010

(51) Int. Cl.
F16D 65/08 (2006.01)
(52) U.S. Cl. ................. 188/250 G; 188/250 B
(58) Field of Classification Search .............. 188/234, 188/247, 250 B, 250 G
See application file for complete search history.

(56) References Cited

U.S. PATENT DOCUMENTS

| 1,628,388 | A | * | 5/1927 | Cautley | 188/250 D |
|---|---|---|---|---|---|
| 1,636,003 | A | * | 7/1927 | La Brie | 188/250 C |
| 1,818,090 | A | * | 8/1931 | Peterson | 188/250 D |
| 1,865,548 | A | * | 7/1932 | Whitworth | 188/250 C |
| 1,925,363 | A | | 9/1933 | Apple | |
| 2,139,409 | A | * | 12/1938 | Hunter | 188/234 |
| 3,891,069 | A | * | 6/1975 | Lawrence | 188/250 G |
| 3,941,222 | A | * | 3/1976 | Newstead | 188/250 G |
| 4,569,424 | A | * | 2/1986 | Taylor, Jr. | 188/250 G |
| 5,413,194 | A | | 5/1995 | Kulis, Jr. et al. | |
| 7,320,386 | B2 | * | 1/2008 | Kulis et al. | 188/250 B |
| 2005/0161297 | A1 | | 7/2005 | Uwaydah | |

FOREIGN PATENT DOCUMENTS

| DE | 1211953 B | 3/1966 |
|---|---|---|
| DE | 2057215 A1 | 6/1971 |
| DE | 2423870 | 12/1974 |

(Continued)

Primary Examiner — Christopher Schwartz
(74) Attorney, Agent, or Firm — Novak Druce Connolly Bove + Quigg LLP (57) ABSTRACT A brake pad backing (1) for a drum brake has a backing surface (2) that receives at least one friction pad (3). At least one opening (4, 4") arranged inside the backing surface (2) is produced by shaping a material section (5, 5') of the brake pad backing (1) so that when the friction pad (3) is pressed onto the backing surface (2), the material section (5, 5'), together with the opening (4, 4'), forms an impression cavity (6). The material section (5, 5') projects from the brake pad backing (1) at one or more prescribed angles α in the pressing direction (7). In addition, a lateral guide (20) to guide the brake pad backing plate (1) in the housing of the brake assembly such as, for example, the brake drum, may be formed by bending or folding the edge (8) of the brake pad backing plate (1). The bent edge (8) is provided on several edge sections (11, 12, 13) of the appertaining lengthwise side (10) of the brake pad backing plate (1) that lie to the side of the backing surface (2) for the friction pad (3).

13 Claims, 5 Drawing Sheets

FOREIGN PATENT DOCUMENTS

| | | |
|---|---|---|
| DE | 2839329 A1 | 3/1980 |
| DE | 19749574 | 5/1999 |
| EP | 1626193 | 2/2006 |
| GB | 306269 | 2/1929 |
| GB | 845623 | 8/1960 |
| GB | 2311569 | 10/1997 |
| JP | 52-85093 | 11/1993 |
| JP | 2002295541 A | 10/2002 |

* cited by examiner

PRIOR ART

SECTION A-A

BACKING FOR BRAKE DEVICES, ESPECIALLY DRUM BRAKES, BACKING/FRICTION LINING UNIT AND BACKING SUPPORT OF A PRESSING DEVICE

CROSS-REFERENCE TO RELATED APPLICATIONS

This application is a national stage application (under 35 U.S.C. 371) of PCT/EP2007/002696 filed Mar. 27, 2007, which claims the benefit of German application 10 2006 014 406.6 filed Mar. 27, 2006.

DESCRIPTION

The present invention relates to a brake pad backing or a brake pad backing plate for brake assemblies, especially for drum brakes. Furthermore, the invention relates to a backing/friction-pad unit, and to a brake pad backing support of a pressing device for the production of a friction pad on a brake pad backing.

TECHNICAL BACKGROUND

Brake pads can be attached to the brake pad backing of the brake assembly in different ways. In drum brakes, nowadays the brake pad is generally glued onto the usually metal brake pad backing and/or affixed thereto by means of rivets. The brake pad can also be attached to the brake pad backing by directly pressing the friction material onto the brake pad backing, whereby in this case, an adhesive has to be applied onto the brake pad backing prior to the pressing procedure.

STATE OF THE ART

A brake pad backing of the above-mentioned type is known from German patent application DE 2 423 870 A. The brake pad backing there is part of a brake shoe in which the friction pad is formed in that it is cast or sprayed onto the brake pad backing. In order to improve the connection between the brake pad backing and the friction pad, the familiar brake pad backing has openings into which friction material flows during the production of the friction pad, as a result of which attachment elements of the friction pad are formed that interengage with the openings. The openings of the brake pad backing can be created through punching or else the brake pad backing can consist of a perforated metal plate.

Even though the openings improve the connection between the friction pad and the brake pad backing plate in the prior-art brake pad backing, the mechanical anchoring of the friction pad onto the brake pad backing produced when the friction pad is cast or sprayed on is not satisfactory.

A similar brake pad backing is known from U.S. Pat. No. 4,569,424. This prior-art brake pad backing is intended for use in a drum brake and has a backing surface that serves to receive at least one friction pad as well as a plurality of projections arranged on the backing surface. These projections are created by cutting a contour out of the brake pad backing and bending the contour along a bending edge. The projections are oriented in the direction of the friction pad and they penetrate into the friction pad. This is meant to bring about a mechanical anchoring of the friction pad onto the brake pad backing.

In the case of this prior-art brake pad backing, the problem can occur that, during a braking operation with a friction pad that is almost worn out, the projections can drag against the counter-friction surface that corresponds to the friction pad. This can cause deep scoring in the counter-friction surface, which can considerably impair the braking function.

Another brake pad backing is disclosed in U.S. Pat. No. 5,413,194. In this publication as well, the brake pad backing has at least one opening into which friction material penetrates, thus mechanically anchoring the friction material onto the brake pad backing. In this Case, a brake pad backing/friction-pad unit is created in that friction material is pressed onto the brake pad backing, and during the pressing procedure, the friction material passes through the openings and forms a damping layer on the side of the brake pad backing that faces away from the friction pad. For this purpose, the brake pad backing is placed onto a matching brake pad backing support that has a recess for the friction material that passes through the openings, said recess forming an impression cavity for the damping layer that is to be formed.

Figure 1:
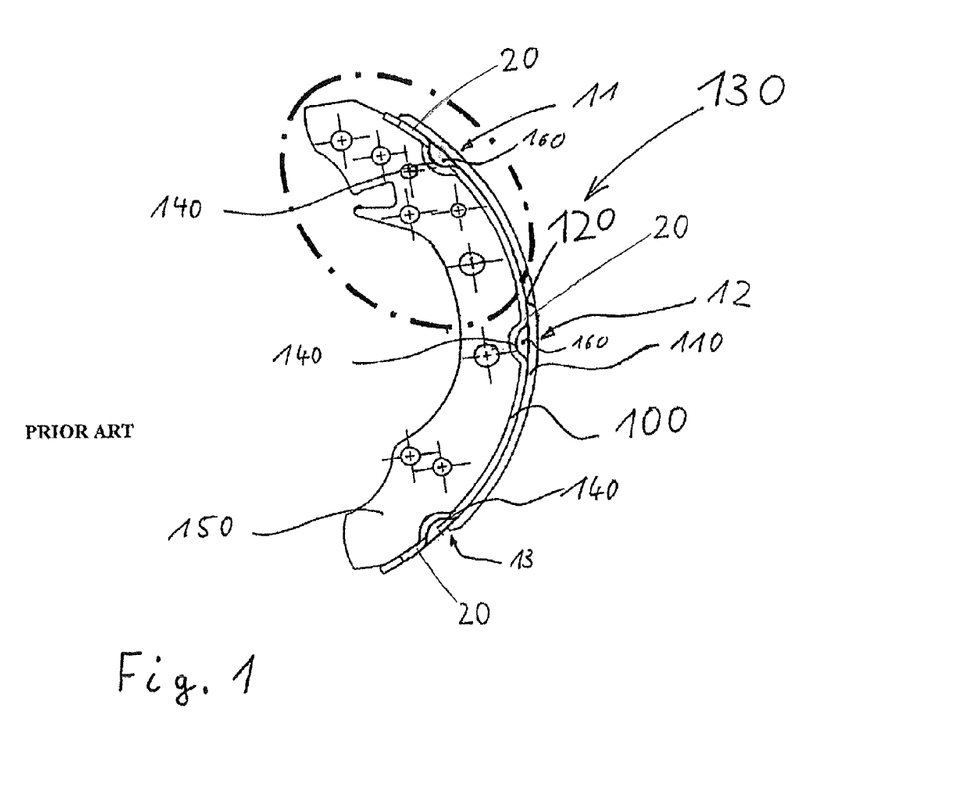
FIG. 1—an embodiment of a brake pad backing plate with a friction pad placed thereupon, for a drum brake according to the state of the art, in a side view.

The known brake pad backings can have a lateral guide along their lengthwise side such as can be seen, for example, in FIG. 1 of the present patent application (reference numeral 20). The lateral guide is in the form of ribs made crosswise to the lengthwise direction of the brake pad backing plate, whereby the lateral guide is formed by the contour of the ribs on the lengthwise sides of the brake pad backing.

With these prior-art brake pad backing plates, wherever there is a rib, a hollow space is formed between the brake pad backing plate and the friction pad applied thereupon if the friction pad was applied without being actually pressed in, that is to say, if it was applied by means of gluing or riveting, for instance. Over the course of time, abraded particles, for example, from the friction material, get packed in these hollow spaces so tightly that the guiding function of the lateral guide is severely impaired.

A brake pad backing plate for a drum brake is also disclosed in German patent application DE 197 49 574 A1. The ends of this prior-art brake pad backing plate each have an area on which the brake pad backing or the brake shoe is supported on a counter bearing.

Envisaged Objective

Before this background, it is an objective of the invention to provide a brake pad backing or a brake pad backing plate having the above-mentioned features, by means of which a brake pad backing/friction-pad unit can be realized which allows braking in a manner that is dependable and malfunction-free over a long run. Moreover, it would be advantageous to have a brake pad backing support for a pressing device that would permit a friction pad to be produced on said brake pad backing.

SUMMARY OF THE INVENTION

In order to achieve this objective, a brake pad backing is put forward that has the features cited in claim 1. The brake pad backing is characterized, among other things, in that the material section projects from the brake pad backing at one or more prescribed angles α in the pressing direction.

Since the material section projects from the brake pad backing in the pressing direction, one can prevent the material section from being pressed into the opening due to the pressing force being exerted during the pressing procedure, and consequently, one can prevent the impression cavity formed by the opening and the material section from inadvertently being closed. Owing to the fact that the material section is positioned at a prescribed angle α relative to the brake pad backing, the friction material that passes through the impression cavity during the pressing procedure can be systematically set in terms of the amount that is pressed through and in terms of its degree of compression, so that it can be adapted to a prescribed pressing force. As a result, it is possible to prescribe the firmness or durability of the friction material in the impression cavity, that is to say, in the area of the material section and the opening, thus influencing the strength of the mechanical anchoring in this area.

Consequently, in a simple and inexpensive manner, it is possible to realize a brake pad backing/friction-pad unit in which the friction pad is prevented from becoming detached from the brake pad backing, even under extreme loads, as a result of which dependable and malfunction-free braking is ensured over the long run.

Since at least one material section is shaped with respect to the brake pad backing in such a way that, when the friction pad is pressed onto the backing surface, the material section, together with the opening, forms an impression cavity, and the material section acquires a function when the friction pad is pressed onto the backing surface. After all, the material section, together with the opening, makes it possible to mechanically anchor the friction pad in that the friction material is pressed into the impression cavity formed by the material section and the opening. Consequently, the mechanical anchoring is effectuated in a different way from that of the prior-art brake pad backings, in which the material sections are formed as projections that penetrate into the friction pad.

Preferably, the angle α between the brake pad backing and the material section should be between 10° and 60°. Within this range, the material section, together with the opening, functions particularly well as an impression cavity.

When the angle α is between 25° and 45°, the friction material is optimal in terms of the amount that passes through and in terms of its compression.

In an advantageous manner, the angle α can be varied. Thus, a variation of the angle position of the material section relative to the brake pad backing means that the throughput amount as well as the density of the friction material passing through the impression cavity can be set or regulated as a function of the pressing force in question.

According to an embodiment of the invention, several openings and material sections are provided in order to achieve a better mechanical anchoring of the friction pad onto the brake pad backing.

The production can be realized in a technically simple manner if the material sections are arranged in at least one row.

Another measure with the same goal is for the material section(s) and the appertaining opening(s) to have essentially the same arrangement in the row.

This also applies if at least two rows are provided, with the opening(s) and the appertaining material section(s) being arranged in the same direction.

As an alternative, it can also be provided that at least two rows are present, with the opening(s) and the appertaining material section(s) being arranged in opposite directions.

Another embodiment of the invention provides that the openings are arranged at least in the edge area of the friction pad and preferably adjacent to the edge of the friction pad. This prevents moisture from penetrating between the friction pad and the backing surface of the brake pad backing, thus preventing the friction pad from becoming detached from the backing surface, which could be brought about by such moisture.

It is advantageously provided that the at least one row or the at least two rows run in the direction of the lengthwise axis of the brake pad backing. As a result, the rows can be produced with very little technical effort since this does away with the need for the tools to travel several times in order to create the opening and the material section.

Here, it is advantageously the case that the at least one material section is configured as a tab whose contour is preferably created by means of a separation method, especially by stamping or cutting. As a result, the material section can be technically produced in a simple manner and involving little effort.

The brake pad backing can be configured to be curved or essentially flat. The flat configuration of the brake pad backing means that it can also be employed for disc brakes. The curved configuration of the brake pad backing, in contrast, allows its use in drum brakes.

In order to achieve the envisaged objective, a brake pad backing plate is proposed that has the features cited in claim 13. The brake pad backing plate is characterized, among other things, in that a lateral guide is formed by shaping, especially bending, the edge of the brake pad backing plate on several edge sections of the appertaining lengthwise side of the brake pad backing plate that lie to the side of the backing surface for the friction pad.

Owing to this measure, the backing surface of the brake pad backing plate remains unaltered during the production of the lateral guide. This avoids the formation of hollow spaces between the backing surface and the friction pad, of the type found with the prior-art brake pad backing plates and produced by the ribs provided there. In particular, this eliminates the drawback encountered with the hollow spaces between the backing surface and the friction pad, namely, that the guiding function of the lateral guide is impaired by deposits formed in the hollow spaces. Therefore, a brake pad backing plate/friction-pad unit can be created that allows braking that is dependable and malfunction-free over the long run. Moreover, the bending makes it particularly easy as well as inexpensive to produce the lateral guide.

Preferably, the lateral guide should be created by folding the edge. This allows a precise bending or folding of the edge along a prescribed bending line or bending edge.

According to an embodiment of the invention, it is provided that the surface of the bent edge facing the outside forms a sliding surface by means of which the brake pad backing plate can be moved in such a way that it is guided along the housing of the brake assembly. This forms a relatively large guiding surface or sliding surface on the brake pad backing plate, which results in an improved guiding function. In particular, tilting or canting of the brake pad backing plate in the housing of the brake assembly is prevented. This measure is also intended to create a brake pad backing plate/friction-pad unit, so as to ensure braking that is dependable and malfunction-free.

It is advantageous for the bent edge to be oriented away from the friction pad. This prevents the bent edge from being pressed against the counter-friction surface of the brake assembly during braking since this would impair the braking effect and damage the brake assembly.

According to another embodiment of the invention, it is provided that the bent edge is configured in the form of a tab on at least three edge sections of the appertaining lengthwise side of the brake pad backing plate. This avoids the problems that occur when the edge of a curved brake pad backing plate is bent, for example, in the case of drum brakes. As a result, the lateral guide can be produced without any difficulties, virtually independently of the magnitude of the curvature of the brake pad backing plate.

Owing to the preferably three edge sections that are to be provided, the brake pad backing plate is guided at three places of the lengthwise side, in the form of a three-point guidance, thus ensuring an adequate guiding function.

The lateral guidance can be improved if it is provided that the edge sections are arranged so as to be distributed over the length of the lengthwise side. Here, the edge sections preferably should be positioned at equal distances. This measure achieves an optimal lateral guidance of the brake pad backing plate in the housing of the brake assembly.

Furthermore, for purposes of achieving the objective, a backing/friction-pad unit is proposed comprising a brake pad backing with at least one opening and a friction pad that is created by pressing friction material onto the brake pad backing, a process in which the friction material is pressed through the opening and made into a positive-fit element that holds the friction pad in the opening. This measure creates a particularly strong mechanical anchoring of the friction pad onto the brake pad backing.

According to an embodiment of the invention, it is provided that the positive-fit element has a thickened area, preferably in the form of a rivet head, that protrudes beyond the opening. This produces an especially effective positive-fit element that can protrude along the entire circumference beyond the passage formed by the opening and the material section.

Furthermore, in order to achieve the objective, a brake pad backing support of a pressing device is put forward onto which a brake pad backing can be placed, comprising at least one recess that corresponds to an opening of the brake pad backing. Among other things, the brake pad backing support is characterized in that the recess is configured to receive the material section of the brake pad backing that belongs to the opening.

In a simple and cost-effective manner, this creates the conditions for the opening—together with the appertaining material section of the brake pad backing—to function as an impression cavity for the friction material during the pressing procedure, thus creating the mechanical anchoring of the friction pad onto the brake pad backing. Therefore, the brake pad backing support makes it possible to produce a brake pad backing/friction-pad unit which ensures braking that is dependable and malfunction-free over the long run.

Advantageously, the at least one recess has a contact surface for the material section of the brake pad backing. As a result, during the pressing procedure, the material section is systematically placed in a prescribed position in the recess of the brake pad backing support, so that the impression cavity formed by the opening and the material section is kept in a prescribed shape.

In this context, the contact surface for the material section should be arranged at a prescribed angle α relative to the boundary surface of the opening. This allows the amount of friction material pressed through the opening to be set at a prescribed value, so that the strength of the mechanical anchoring of the friction pad onto the brake pad backing can be set at a prescribed value as a function of the pressing force.

According to another embodiment of the brake pad backing support, it is provided that the at least one recess is configured in such a way that the friction material pressed through the opening during the pressing procedure can be shaped into a positive-fit element that holds the friction pad on the brake pad backing with a positive fit.

In this manner, the mechanical anchoring can be created simply and cost-effectively together with the formation of the positive-fit element in that this is done by means of a pressing procedure. Therefore, with this pressing procedure, the friction material is utilized, on the one hand, to form the friction pad and, on the other hand, to create the mechanical anchoring of the friction pad onto the brake pad backing.

According to another embodiment of the invention, it is provided that the at least one recess is configured to form a thickened area, especially a rivet head, that protrudes beyond the opening. Such a recess is easy to create.

Description of Embodiments

Additional objectives, advantages, features and application possibilities of the present invention can be gleaned from the description below of various embodiments making reference to the drawing. Here, all of the described and/or illustrated features, either on their own or in any desired meaningful combination, constitute the subject matter of the present invention, also irrespective of their compilation in the claims or of their referral back to other claims.

The following is shown.

FIG. 1 shows a schematic view of an embodiment of a backing/friction-pad unit 130 of the type already known from the state of the art. This backing/friction-pad unit 130 is intended for use in a drum brake and has a curved brake pad backing plate 100 and a friction pad 110 that has been applied onto the backing surface 120 of the brake pad backing plate 100, preferably by means of gluing.

In the embodiment according to FIG. 1, the brake pad backing plate 100 is firmly joined to a brake shoe 150, preferably made out of a single piece. Along its lengthwise sides, the brake pad backing plate 100 has a lateral guide 20 by means of which, during the braking procedure, the brake pad backing plate 100 executes a guided movement of the brake pad backing plate 100 on the walls (not shown here) of the brake assembly (not shown here) such as, for instance, a brake drum. The lateral guide 20 is realized by ribs 140 made crosswise into the backing surface 120 of the brake pad backing plate 100, and the contour of said ribs along the longitudinal sides of the brake pad backing plate 100 forms the lateral guide 20.

As can be seen in FIG. 1, wherever there is a rib 140, a hollow space 160 is formed between the brake pad backing plate 100 and the friction pad 110 applied thereupon.

Figure 2:
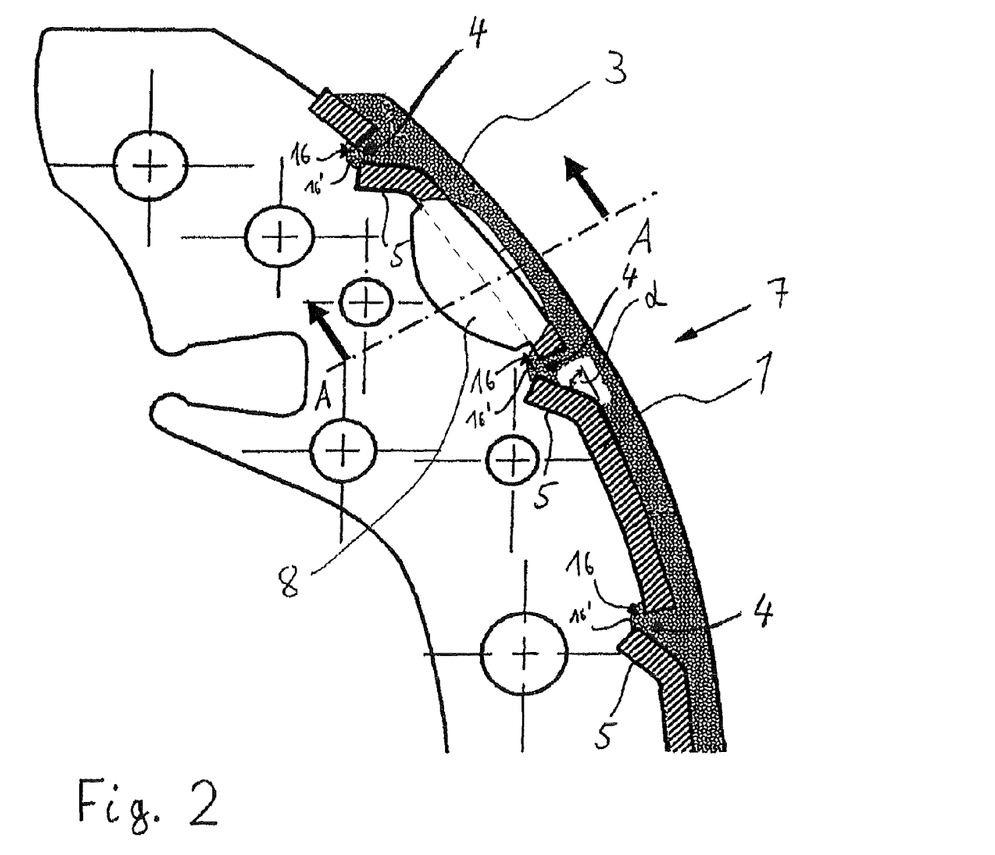
FIG. 2—a conceivable embodiment of the brake pad backing according to the invention, with a friction pad placed thereupon, in a longitudinal view.
Figure 3:
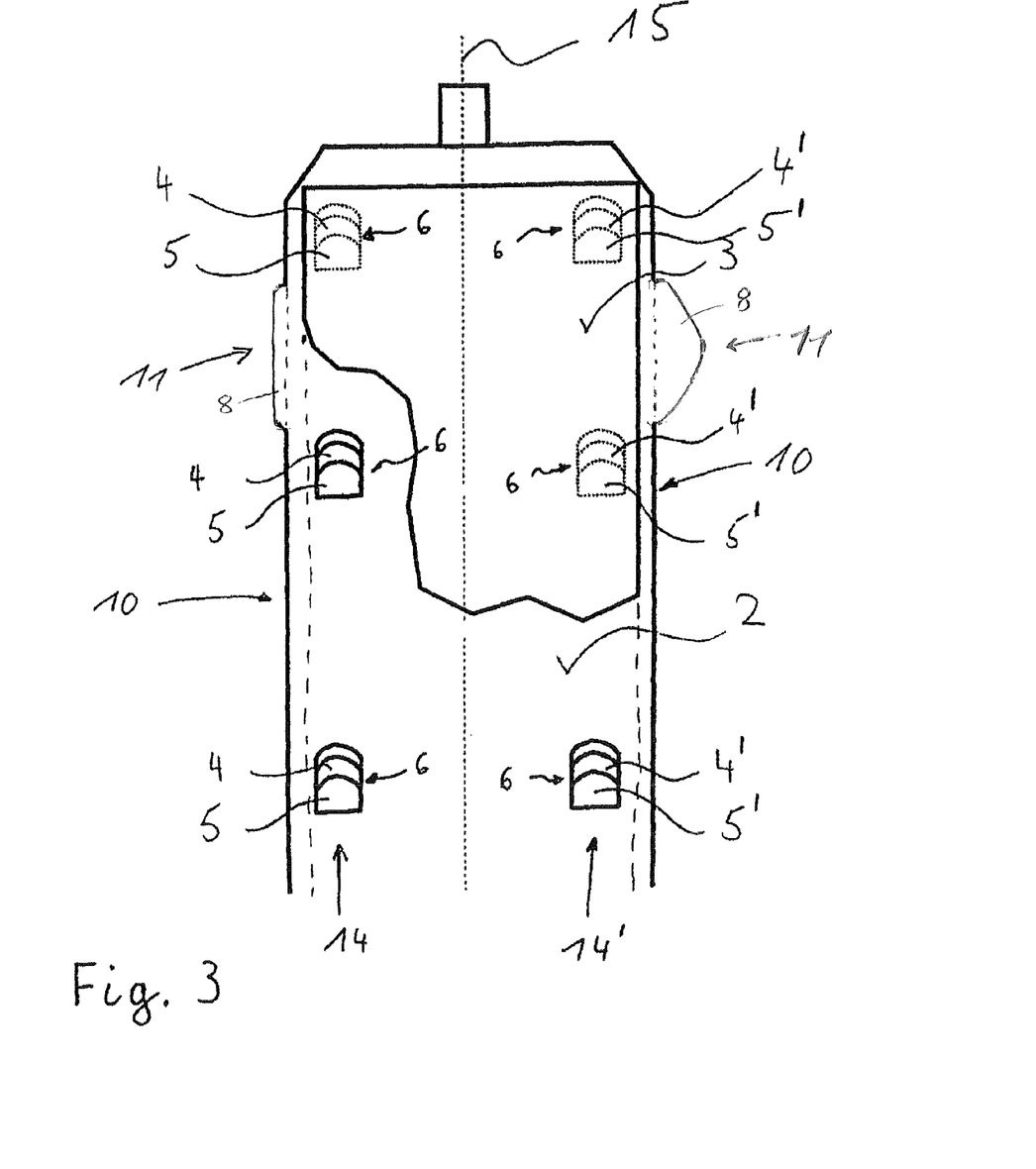
FIG. 3—the brake pad backing according to FIG. 2, in a top view.
Figure 4:
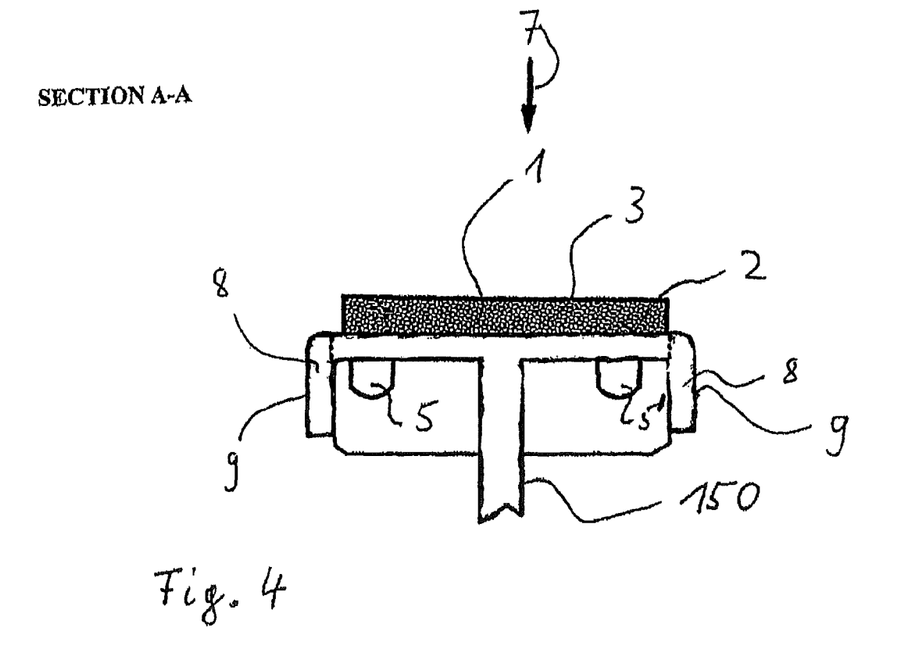
FIG. 4—the brake pad backing according to FIG. 2, in a cross-sectional view along the sectional line A-A.

FIGS. 2, 3 and 4 show different views of embodiments of a backing/friction-pad unit 30 according to the invention. Like the prior-art backing/friction-pad unit 130 according to FIG. 1, the backing/friction-pad unit 30 likewise has a brake pad backing 1 having a backing surface 2 and a friction pad 3 applied there-upon. Here, in FIGS. 2 and 3, only the backing/friction-pad unit 30 according to the invention is shown, corresponding to the section marked with the dot-dash line in FIG. 1.

The backing/friction-pad unit 30 according to the invention already differs from the prior-art backing/friction-pad unit 130 according to FIG. 1, among other things, in that the lateral guide 20 is formed by bending, preferably folding, the edge 8 of the brake pad backing plate 1, as can be seen especially well in FIG. 4. In this context, the surface 9 of the bent edge facing the outside forms a sliding surface by means of which the brake pad backing plate 1 can be moved in such a way that it is guided on the housing (not shown here) of the brake assembly (not shown here).

In the embodiment according to FIGS. 2 to 4, the bent edge 8 is configured in the form of a tab on at least one, preferably on at least three edge sections 11, 12, 13, of the appertaining lengthwise side 10 of the brake pad backing plate 1, said tab facing away from the friction pad 3. In FIG. 3, the edge 8 on the left side is shown in a folded downwardly position, and the edge 8 on the right side is shown prior to being bent or folded downwardly.

The edge sections 11, 12, 13 are distributed over the length of the lengthwise side 10, preferably at equal distances.

The embodiment of the backing/friction-pad unit 30 according to the invention shown in FIGS. 2 to 4 also differs from the prior-art backing/friction-pad unit 130, among other things, in that there, the friction pad 3 is produced by pressing a friction material onto the backing surface 2 of the brake pad backing 1, whereby the friction pad 3 and the brake pad backing 1 are affixed to each other only by means of a mechanical anchoring. The use of an adhesive or of rivets to attach the friction pad to the brake pad backing is not necessary in the case of the backing/friction-pad unit 30 according to the invention, but in principle it can also be implemented.

The mechanical anchoring of the friction pad 3 onto the backing surface 2 is established by means of at least one opening 4 or 4' arranged inside the backing surface 2, said opening being created by shaping, for example, bending, a material section 5 or 5' of the brake pad backing 1. Here, the at least one material section 5 or 5' is configured as a tab whose contour is preferably made by means of a separation method, especially by stamping or cutting.

The material section 5 or 5' protrudes from the brake pad backing 1 towards the pressing direction 7 and, together with the opening 4 or 4', forms an impression cavity 6.

When the friction material is pressed onto the backing surface of the brake pad backing 1, the impression cavity 6 causes friction material to be pressed all the way through the opening 4 or 4' and shaped into the positive-fit element 16 that holds the friction pad 3 in the opening 4 or 4'.

In the embodiment shown here, the positive-fit element 16 has a thickened area 16' in the form of a rivet head so that the rivet head creates a positive connection between the friction pad 3 pressed out of the friction material and the brake pad backing 1.

The durability of this positive connection can be considerably influenced by the angle position of the material section 5 relative to the brake pad backing 1. In the embodiment according to FIGS. 2 to 4, the material section 5 is arranged at a prescribed angle α relative to the brake pad backing plate 1, whereby the angle α is between 25° and 45°. Fundamentally, the angle α can be between 10° and 60°. The angle position of the material section 5 relative to the brake pad backing 1 can be used to influence or regulate, for instance, the amount and density of the friction material that passes through the impression cavity 6 when the friction material is pressed through the impression cavity 6.

In the embodiment according to FIGS. 2 to 4, several openings 4, 4' and material sections 5, 5' are provided which are arranged in a row, preferably in at least two rows 14, 14'. In each row 14 or 14', the arrangement of the material section 5 or 5' and the appertaining opening 4 or 4' is essentially the same. The arrangement of the opening 4 or 4' and of the appertaining material section 5 or 5' between the two rows 14, 14' is oriented in the same direction, whereby the two rows 14, 14' run in the direction of the lengthwise axis 15 of the brake pad backing 1.

Preferably, the openings 4, 4' are arranged at least in the edge area of the friction pad 3. It is likewise preferred for the openings 4, 4' to be adjacent to the edge of the friction pad 3.

Figure 5:
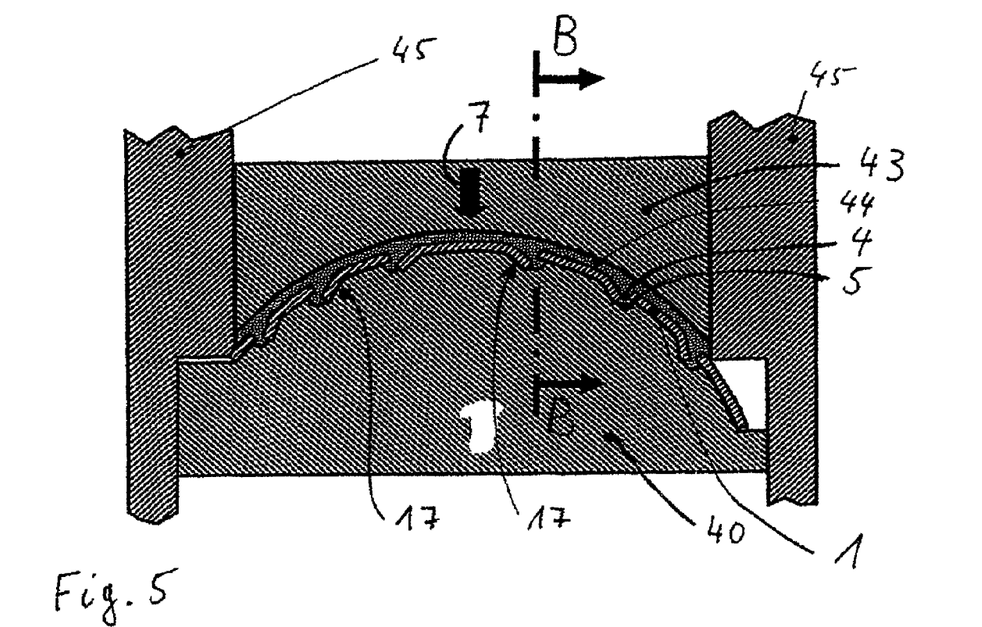
FIG. 5—a conceivable embodiment of a pressing device for the production of a friction pad on the brake pad backing according to FIG. 2, in a longitudinal view.
Figure 6:
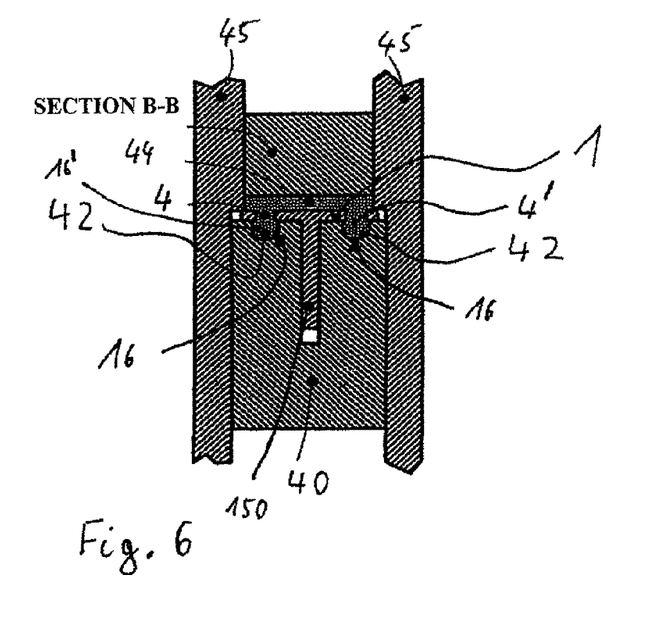
FIG. 6—the pressing device according to FIG. 5, in a cross-sectional view along the sectional line B-B.

FIGS. 5 and 6 show another embodiment of a pressing device 41 for the production of the friction pad 3 on the brake pad backing 1. The pressing device 41 has a brake pad backing support 40 onto which the brake pad backing 1 can be placed. Moreover, the pressing device 41 has a pressing stamp 43 with which the pressing force is applied onto the friction material in order to form the friction pad 3. The brake pad backing support 40 as well as the pressing stamp 43 are each guided laterally on a guide 45.

The brake pad backing support 40 has at least one recess 42 that matches a corresponding opening 4 or 4' of the brake pad backing 1, and the friction material that is pressed through this opening 4 or 4' during the pressing procedure can be shaped into a thickened area in the form of a rivet head 16' that holds the friction pad in the opening 4 or 4' with a positive fit.

The recess 42 of the brake pad backing support 40 is configured to receive the material section 5, 5' that belongs to the opening 4 or 4' of the brake pad backing 1. For this purpose, the at least one recess 42 preferably has a contact surface 17 for the material section 5 or 5' of the brake pad backing 1. Preferably, that contact surface 17 should be arranged at a prescribed angle relative to the boundary surface of the opening 4 or 4'. Preferably, this prescribed angle corresponds to the prescribed angle α at which the material section 5 or 5' of the brake pad backing 1 is positioned in the pressing direction 7.

By means of the pressing device 41, a method for the production of the friction pad 3 on the brake pad backing 1 can be carried out as follows: the friction material 44 is pressed by means of the pressing stamp 43 onto the brake pad backing 1 and through the openings 4 or 4' in the brake pad backing 1 into the matching recesses 42 of the brake pad backing support 40. Under the effect of the pressing force, the friction material 44 in the recesses 42 is shaped into a thickened area 16' in the form of a rivet head that protrudes beyond the openings 4, 4' and that creates a positive connection between the friction pad 3 formed by the pressing and the brake pad backing 1.

While preferred embodiments of the invention have been described and illustrated here, various changes, substitutions and modifications to the described embodiments will become apparent to those of ordinary skill in the art without thereby departing from the scope and spirit of the invention.

List of Reference Numerals
1 brake pad backing, brake pad backing plate
2 backing surface
3 friction pad
4, 4' opening
5, 5' material section
6 impression cavity
7 pressing direction
8 edge
9 outer surface
10 lengthwise sides
11 edge section
12 edge section
13 edge section
14, 14' row
15 lengthwise axis
16 thickened area, rivet head
17 contact surface 20 lateral guide
30 backing/friction-pad unit
40 brake pad backing support
41 pressing device
42 recess
43 pressing stamp
44 friction material
45 guides
100 brake pad backing
110 friction pad
120 backing surface
130 backing/friction-pad unit
140 ribs
150 brake part, brake shoe
160 hollow space

The invention claimed is:

1. A backing and friction-pad unit (30) of a drum brake, comprising:
- a brake pad backing (1) with a backing surface (2) that serves to receive at least one friction pad (3), said backing surface (2) defining at least one opening (4, 4') arranged on or inside the backing surface (2) which is produced by shaping a material section (5, 5') of the brake pad backing (1) so that the material section (5, 5') projects from the brake pad backing (1) at one or more prescribed angles a in the pressing direction (7), wherein the material section (5, 5'), together with the opening (4, 4'), forms an impression cavity (6) when the friction pad (3) is pressed onto the backing surface (2);
- the friction pad (3) that is created by pressing friction material onto the brake pad backing (1), wherein friction material of the friction pad (3) is pressed through the opening (4, 4') and made into a positive-fit element (16) that has a thickened area that protrudes beyond the opening (4, 4') and holds the friction pad (3) on the brake pad backing (1) with a positive fit; and
- at least one folded edge (8) on one or more edge sections (11, 12, 13) of at least one of the lengthwise sides (10) of the brake pad backing plate (1) with said folded edge (8) folded downwardly from the backing surface (2) in a direction away from the friction pad (3) and over the edge section so that the folded edge (8) lies to a side of the backing surface (2) for the friction pad (3) and extends laterally beyond the edge section of the lengthwise side (10), and wherein an outer surface (9) of the folded edge (8) forms a sliding surface for laterally guiding the brake pad backing plate (1) along the housing of the brake assembly.

2. The backing and friction-pad unit according to claim 1, wherein several openings (4, 4') and material sections (5, 5') are provided and are arranged in at least one row (14, 14').

3. The backing and friction-pad unit according to claim 2, wherein the angles α can be varied between the brake pad backing (1) and respective material sections (5, 5') in a given row (14, 14') or as between separate rows (14, 14').

4. The backing and friction-pad unit according to claim 3, wherein the material section (5, 5') and the appertaining opening (4, 4') have essentially the same arrangement in a given row (14, 14').

5. The backing and friction-pad unit according to claim 2, wherein at least two rows (14, 14') are provided, with the opening (4, 4') and the appertaining material section (5, 5') arranged in the same direction.

6. The backing and friction-pad unit according to claim 2, wherein at least two rows (14, 14') are provided, with the opening and the appertaining material section arranged in opposite directions.

7. The backing and friction-pad unit according to claim 1, wherein the openings (4, 4') are arranged at least in the edge area of the friction pad (3) and adjacent to the edge of the friction pad (3).

8. The backing and friction-pad unit according to claim 2, wherein the at least one row (14, 14') runs in the direction of the lengthwise axis (15) of the brake pad backing (1).

9. The backing and friction-pad unit according to claim 1, wherein the prescribed angles α between the brake pad backing (1) and the material section (5, 5') are between about 10° and 60°.

10. The backing and friction-pad unit according to claim 9, wherein the prescribed angles a are between about 25° and 45°.

11. The backing and friction-pad unit according to claim 1, wherein the at least one material section (5, 5') is configured as a tab.

12. The backing and friction-pad unit according to claim 1, wherein the brake pad backing (1) is configured to be curved or essentially flat.

13. The backing and friction-pad unit according to claim 1, wherein the friction pad (3) is joined to the brake pad backing (1) only by mechanical anchoring of a plurality of positive-fit elements (16).

* * * * *

UNITED STATES PATENT AND TRADEMARK OFFICE
CERTIFICATE OF CORRECTION

PATENT NO. : 8,376,097 B2  Page 1 of 1
APPLICATION NO. : 12/293359
DATED : February 19, 2013
INVENTOR(S) : Klaus Junge It is certified that error appears in the above-identified patent and that said Letters Patent is hereby corrected as shown below:

On the Title page insert item:

--(30)  Foreign Application Priority Data

March 27, 2006    DE ....................... 10 2006 014 406.6--

Signed and Sealed this
Eleventh Day of June, 2013

Teresa Stanek Rea
*Acting Director of the United States Patent and Trademark Office*